INVENTOR.
THOMAS A. DEPREZ

June 9, 1964 T. A. DEPREZ 3,136,093
CUTTER SHARPENING MACHINE
Filed Feb. 23, 1962 6 Sheets-Sheet 3

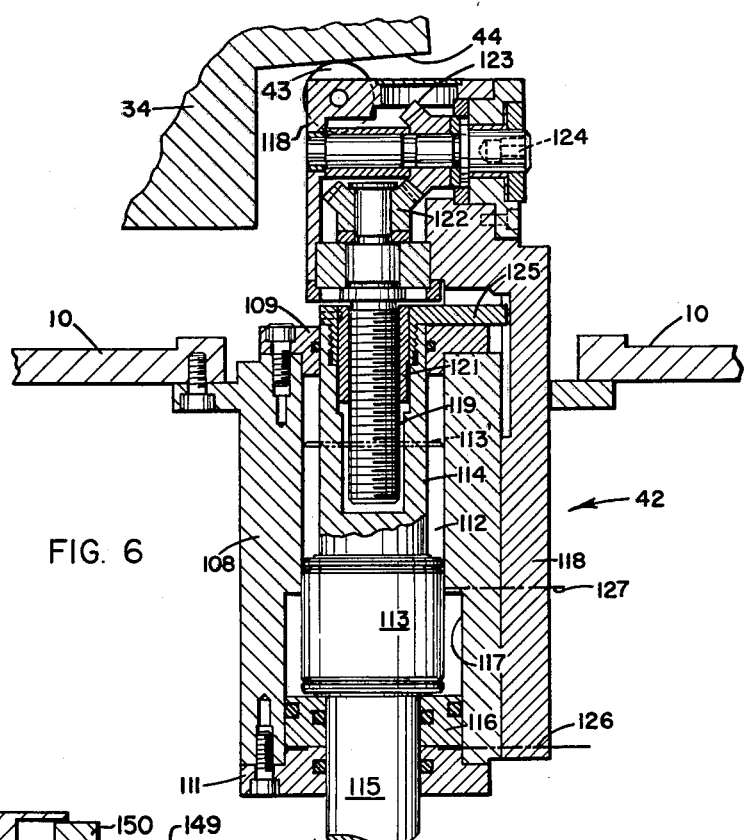
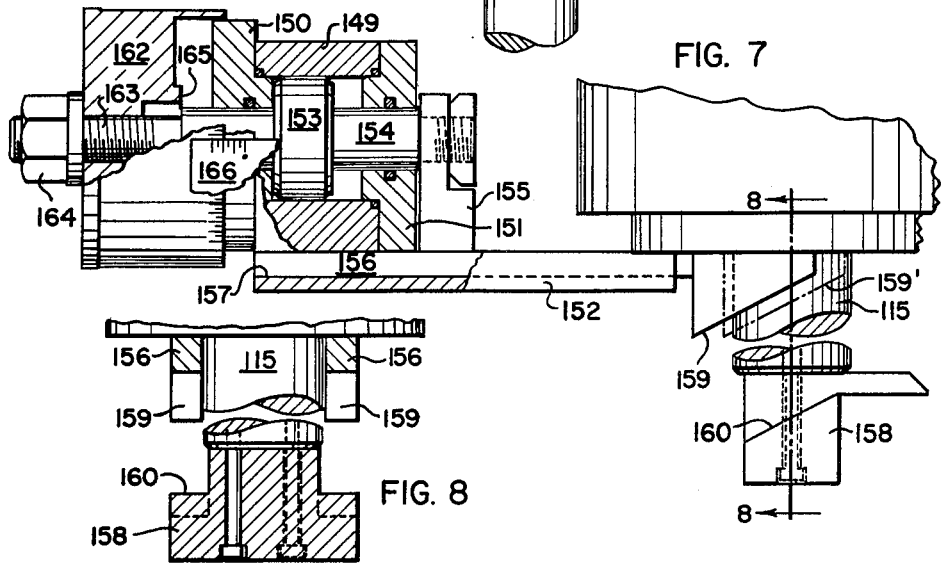

United States Patent Office 3,136,093
Patented June 9, 1964

3,136,093
CUTTER SHARPENING MACHINE
Thomas A. Deprez, Rochester, N.Y., assignor to The Gleason Works, Rochester, N.Y., a corporation of New York
Filed Feb. 23, 1962, Ser. No. 175,261
11 Claims. (Cl. 51—34)

The present invention relates to a cutter sharpening machine of the general kind disclosed in application Serial No. 63,414, filed October 18, 1960, by L. O. Carlsen and myself, and is a continuation-in-part of my application Serial No. 150,959, filed November 8, 1961, now abandoned.

The primary object of the present invention is a machine of simpler and more compact arrangement, yet capable of carrying out the major functions of the machine disclosed in the aforementioned application Serial No. 63,414.

A machine according to one aspect of the invention comprises a frame, a carriage reciprocable relative to the frame and carrying a grinding wheel having a conical surface for traversing a sharpening plane during such reciprocation, a bracket on the frame supporting a work head for angular adjustment thereon about an axis substantially parallel to the direction of carriage reciprocation, an index housing on the work head journaling a cutter spindle whose axis is in perpendicular intersecting relation to the angular adjustment axis, means for adjusting said index housing on the work head in the direction of the cutter spindle axis, said bracket being mounted on the frame for movement relative thereto about a pivot axis perpendicular to both the sharpening plane and said angular adjustment axis, said pivot axis being so widely spaced from the spindle axis in the direction of carriage reciprocation that by movement of the bracket about the pivot axis a cutter on the spindle may be advanced and retracted in the sharpening plane substantially in a direction perpendicular to the wheel stroking motion into and out of the path of the grinding wheel, and means for adjusting said bracket relative to the frame along said pivot axis.

A machine according to another aspect of the invention, for double-angle sharpening circular cutters, comprises a carriage for a grinding wheel having a conical active surface, the carriage being adapted for reciprocation to cause said surface to traverse a sharpening plane, a spindle for supporting a cutter to be sharpened, and means for effecting relative back and forth shifting between the carriage and the cutter spindle in (a) a direction perpendicular to said sharpening plane, (b) about the spindle axis and (c) about an axis parallel to the path of carriage reciprocation, the machine also having a mechanism operable concomitantly with the afore-mentioned means to effect a relative back and forth shifting between the carriage and the cutter spindle in a direction substantially parallel to the sharpening plane and transversely to said path of carriage reciprocation.

The preferred embodiment of the invention is shown in the accompanying drawings, wherein:

FIG. 6 is a detail vertical section in plane 6—6 of FIG. 2;

FIG. 7 is a side view, partly in vertical section, of a variable stop mechanism for changing the vertical position of the cutter during sharpening;

FIG. 8 is a detail section view in the plane designated 8—8 in FIG. 7;

Figure 1:
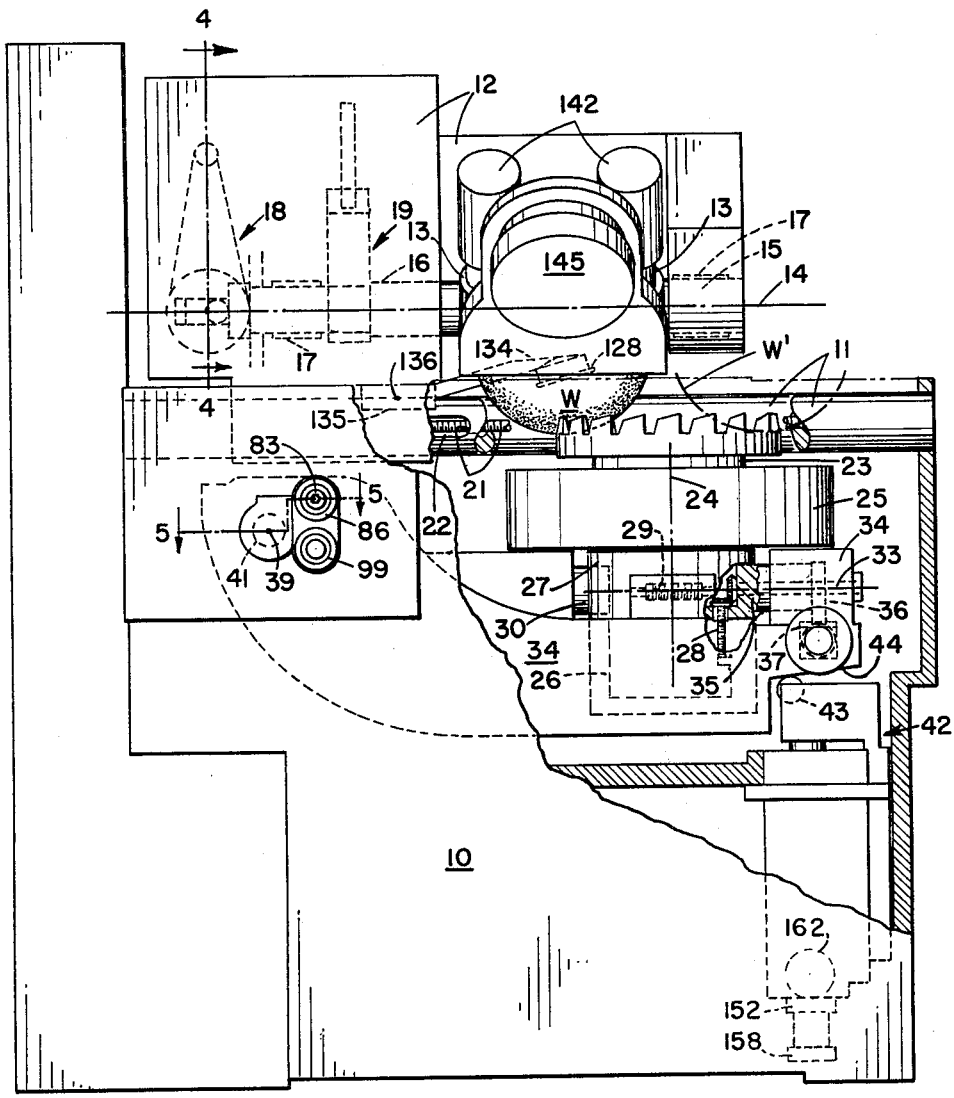
FIGS. 1 and 2 are respectively a side and a front view of the machine, each with parts broken away to show the internal arrangement.
Figure 2:
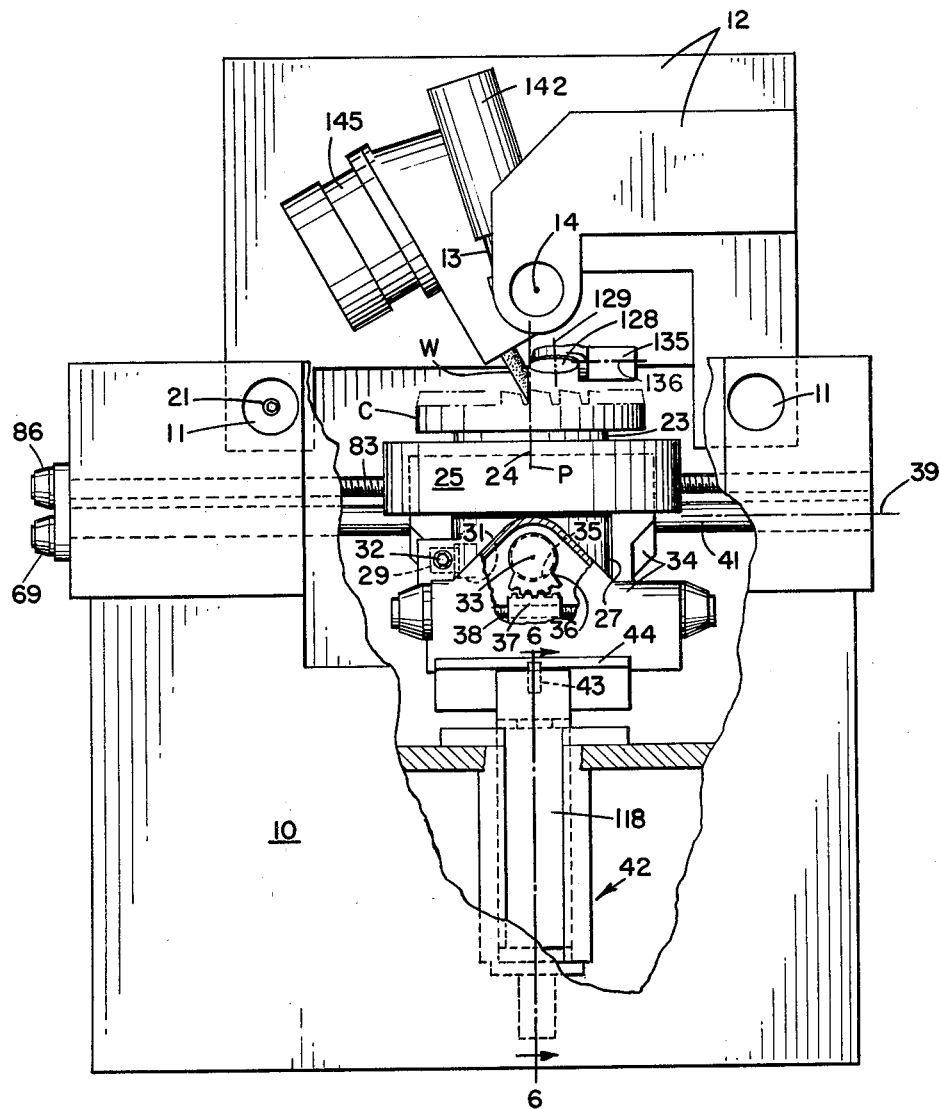

Referring to FIGS. 1 and 2, the machine has a frame 10 supporting at their opposite ends two horizontal rods 11 along which a carriage support bracket 12 is adjustable. A carriage 13 for grinding wheel W is reciprocable on this bracket along axis 14, parallel to rods 11, to traverse the grinding wheel across the blades of a cutter C to be sharpened. Sharpening is in vertical plane P which is tangent to the conical working face of wheel W. The carriage is also angularly movable about axis 14 for feed motion of the wheel. The carriage is supported for both reciprocation and feed by trunnions 15 and 16 which are secured to it and are journaled slidably and rotatably in bearings 17 in bracket 12. Inside the bracket is a mechanism 18 for reciprocating the carriage and a mechanism 19 for effecting the feed motion of the wheel W toward and return motion from the sharpening plane P. These mechanisms are shown in detail in FIGS. 3 and 4, respectively. The stroke of reciprocation is non-adjustable, but by the adjustment of the bracket 12 along rods 11, by means of adjusting screw 21, the wheel stroke may be positioned for a cutter of either right or left hand and of any diameter within the range of the machine. For sharpening a right hand cutter the wheel W is positioned approximately as shown in full lines in FIG. 1, whereas for a left hand cutter it is brought to approximately the position shown in broken lines at W'. Adjusting screw 21 is rotatable in an axial bore in one rod 11, and is threaded to a nut which extends through slot 22 in the rod and is connected to bracket 12.

The cutter C is mounted in a usual manner on a cutter spindle 23 which is journaled for rotation about axis 24 in an index housing 25. In the latter there is a suitable index mechanism, including a notched index plate on he spindle, a plate-holding pawl carried by the housing and means for lifting the pawl and advancing the plate and spindle angularly, to bring successive blades of the cutter into sharpening position. This mechanism may be of the general kind disclosed in afore-mentioned application Serial No. 63,414. The cylindrical lower part 26 of housing 25 is supported in a work head 27 for adjustment therein along and also about axis 24. The adjustment along axis 24 may be effected by an adjusting screw 28, FIG. 1, while the adjustment about the axis may be made by means of a rack 29 which meshes with a gear sector 31 on part 26, FIG. 2, the rack being movable in the work head by means of an adjusting screw 32. Work head 27 is supported for adjustment about axis 33 on a bracket 34, for this purpose having a bearing receiving a trunnion 30 on the bracket, and itself having a trunnion 35 supported in a bearing in the bracket. Trunnion 35 has secured thereto a gear sector 36 meshing a rack 37 that is movable in the bracket by means of an adjusting screw 38. By the adjustment about axis 24 the cutter C may be rotated relative to the sharpening plane P to determine the thickness of stock to be removed, and by the adjustment along the axis the tip plane of the cutter may be brought to a fixed distance from axis 33, this distance being determined by a suitable gage, not shown. By the adjustment about axis 33 the hook angle of the cutter blades may be varied.

Bracket 34 is adjustable along and about an axis 39 perpendicular to the sharpening plane P, for this purpose being slidably mounted on shaft 41 rotatably and slidably supported by the frame 10 in a manner to be described later with reference to FIG. 5. Axis 39 is spaced horizontally from axis 24 at such distance that the primary effect of moving the bracket 34 about it is to raise or lower the cutter, i.e., to move it in the sharpening plane substantially in a direction perpendicular to the wheel stroking motion. Such raising and lowering is effected by a mechanism 42 which is adapted to (a) raise the cutter to sharpening position, (b) retract it to a position clear of the wheel W to enable it to be indexed, (c) to retract it still further, to a position wherein it may be removed and another cutter mounted, and (d) to adjust the tip plane of the cutter to various heights above the plane traversed by the edge of the wheel W, to adapt the machine for sharpening cutter blades of different heights and different angularities of the blade's sharpening face or faces. Mechanism 42 has a roller 43 on which a plane bottom surface 44 of bracket 34 rests, this surface being wide enough for contact with the roller in any position of adjustment of the bracket along axis 39. The adjustment of bracket 34 along axis 39 is employed to vary the offset of the cutter axis from the sharpening plane P and thus vary the rake angle to which the cutter blades are sharpened.

Figure 4:
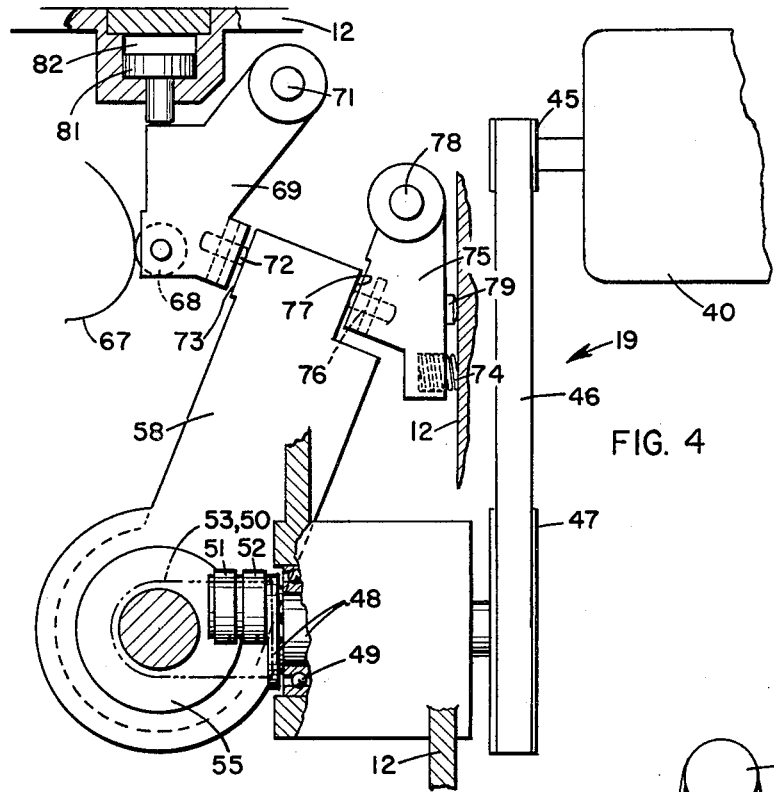
FIG. 4 is a detail view at right angles to FIG. 3 and showing the carriage feed mechanism.
Figure 3:
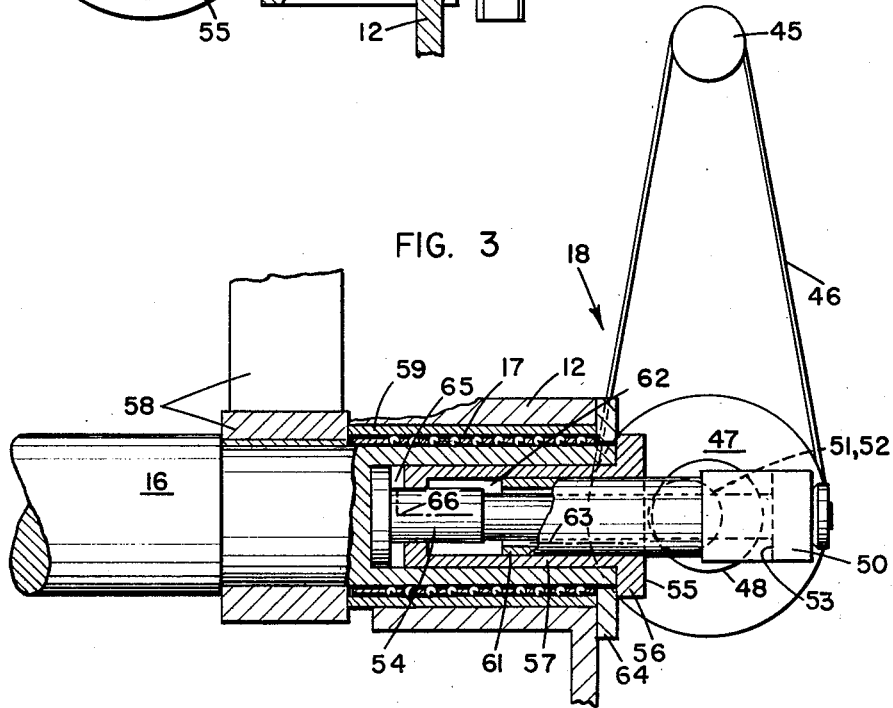
FIG. 3 is a detail view of the mechanism for reciprocating the carriage, approximately in plane 4—4 of FIG. 1.

Referring to FIGS. 3 and 4, the mechanism 18 includes a drive motor 40 having a pulley 45 which through an endless flexible belt 46 drives a pulley 47. The latter is secured to a shaft 48 rotatable on bearing 49 in carriage support bracket 12. The shaft carries eccentrically thereon a pair of coaxial anti-friction rollers 51 and 52 which are respectively engageable with plane transverse surfaces 53 and 55. Surface 53 is on an arm 50 secured to a piston rod 54 that is rigidly connected in coaxial relation to trunnion 16. Surface 55 is on a flange 56 of piston 57. Piston rod 54 is slidable in the piston, while the latter is slidable in a cylinder bore in the trunnion. Secured to the trunnion is a feed arm 58 which, in the limit position of movement of the trunnion to the right in FIG. 3 (to the left in FIG. 1), abuts a bushing 59 secured in bracket 12. This bushing constitutes the outer race of ball-sleeve trunnion bearing 17. Flange 56 of piston 57 in its left limit position, in FIG. 3, abuts the adjacent end of the trunnion. A sleeve 61 slidable in piston 57 is secured to and is in effect a part of piston rod 54.

During operation of the machine the pulley 45 is rotated constantly, and reciprocation of the carriage is controlled by the application of hydraulic pressure against piston 57 and piston rod 54 by means of a suitable control valve, not shown. Upon application of pressure to chamber 62 through a passage in sleeve 61 indicated schematically at 63, the piston 57 is moved to the left in FIG. 3, until its flange 56 abuts a ring 64 secured to bracket 12, and the assembly comprising sleeve 61, rod 54 and trunnion 16 is moved to the right until arm 58 abuts sleeve 59. In this position, shown in FIG. 3, the eccentric rollers 51, 52 are clear of surfaces 53 and 55 so that they rotate idly with shaft 48, and the wheel carriage 13 is held in its left limit position (in FIG. 1). This is the position in which the wheel W is redressed and in which the cutter C is mounted and removed. Upon release of pressure to chamber 62, and application of pressure to chamber 65, through the passage designated 66, the piston 57 is moved to the right in FIG. 3 until surface 55 abuts eccentric roller 52, and piston rod 54 and trunnion 16 are moved to the left until surface 53 abuts eccentric roller 51. Accordingly while this pressure condition is maintained the wheel carriage is reciprocated by the eccentrics.

While the wheel carriage is being reciprocated by eccentrics 51, 52, the mechanism 19 operates to feed the carriage about axis 14 to bring the wheel W to the sharpening plane P and then to return it. Referring to FIG. 4, this mechanism comprises an oscillatory feed cam 67 mounted in bracket 12 and arranged to operate in time with the valve means controlling application of pressure to chambers 62, 65. The cam engages a follower roller 68 carried by a lever 69 pivoted to bracket 12 by pin 71. A second roller, 72, carried by the lever, rolls on a plane surface 73 on the feed arm 58, this surface being of greater longitudinal extent than the axial stroke of trunnion 16 and wheel W. A spring 74 serves to maintain the rollers in contact with the cam and feed arm respectively. The spring acts between the bracket 12 and a lever 75, the latter carrying a roller 76 which rolls on a surface 77 of arm 58 that is of the same longitudinal extent as surface 73. Lever 75 is pivoted to the bracket by a pin 78. In the full infeed position of wheel W, when the wheel is tangent to plane P, the cam 67 holds the levers 69, 75, and the arm 58, in a position wherein a stop button 79 on lever 75 is pressed against bracket 12. During redressing of the wheel W this position is maintained by a hydraulically actuated piston 81 disposed in cylinder chamber 82 in the bracket 12. Pressure is applied against the piston to cause it to act against lever 69 only while the wheel is being redressed.

Figure 5:
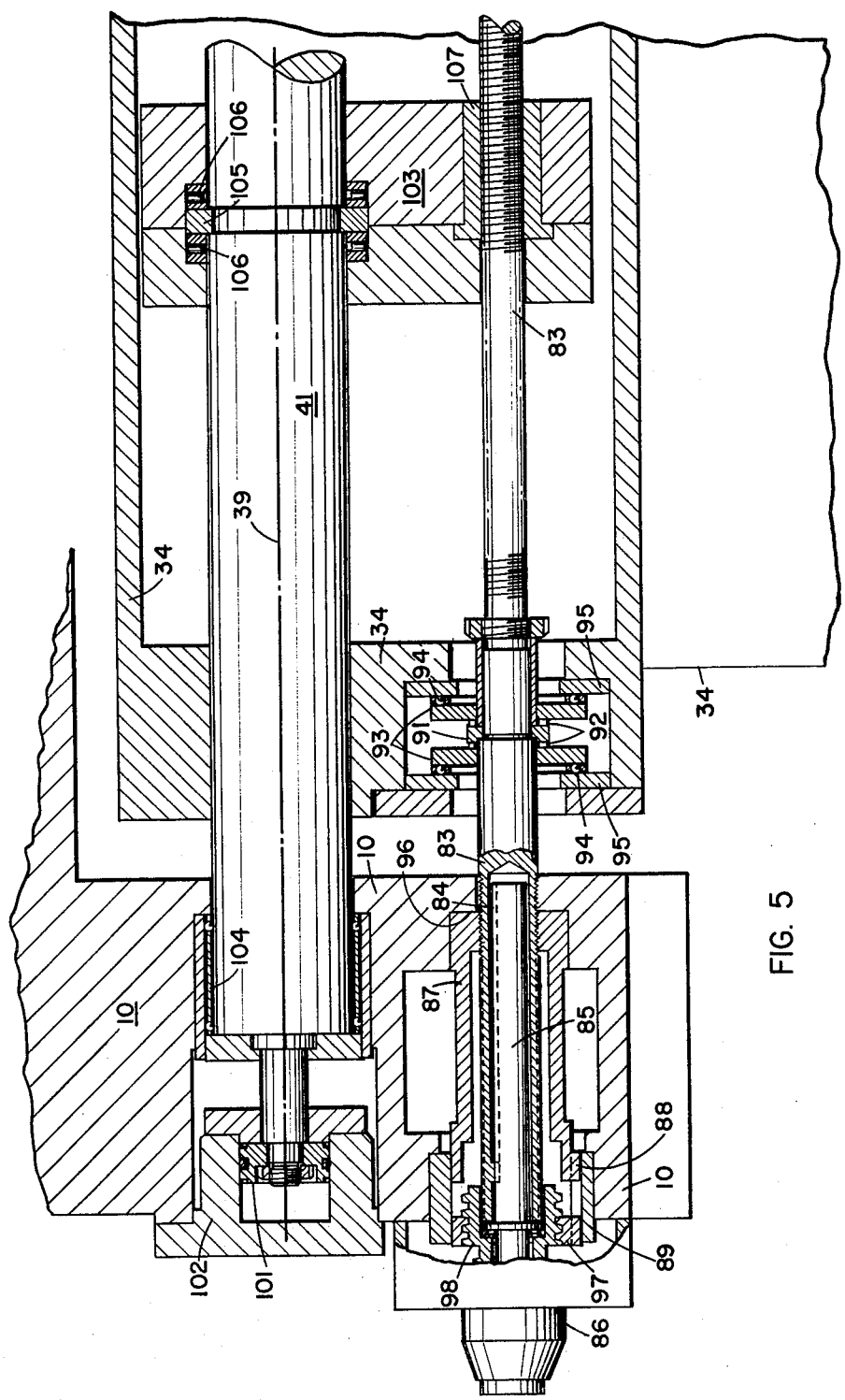
FIG. 5 is a fragmentary plan section in plane 5—5 of FIG. 1.

Referring to FIG. 5, manual adjustment of work head bracket 34 along axis 39 of rod 41 is effected by a screw 83 which is connected by key 84 to a shaft 85. The shaft is rotatable in the frame 10 and carries a calibrated dial 86, while screw 83 is threaded to a nut 87 that is connected by a key 88 to a member 89 fixed to the frame. Hence by manual rotation of shaft 85 the screw 83 is moved axially relative to the nut. The bracket 34 is moved axially along rod 41 with the screw 83, for this purpose there being secured to the screw a collar 91 which acts through roller bearings 92 to provide axial support for rings 93 that are rotatable on the screw. The rings bear axially upon ball bearings 94 which also bear upon rings 95 secured to bracket 34. By reason of the large internal diameter of rings 95 the bearings 94 accommodate the limited angular movement of the bracket 34 about axis 39 effected by mechanism 42.

Nut 87 is movable axially between two limit positions: a first position, shown in FIG. 5, wherein it abuts shoulder 96 on the frame 10 and a second position wherein its opposite end abuts a nut 97. The latter is adjustable axially in member 89 and is held against rotation by key 88. The adjustment is by means of a screw 98 which is threaded to nut 97 in coaxial relation to shaft 85 and is axially immovable in the frame. Screw 98 may be rotated by manually turning calibrated dial 99, FIG. 1, to which it is connected by gearing. Set-over of the nut 87 between its first and second positions may be effected hydraulically, by application of pressure to one or the other end faces of a piston 101 secured to shaft 41 and reciprocable in a cylinder 102 secured to the frame. Motion of the piston is transmitted through shaft 41 and a yoke 103 to screw 83, and from the latter to nut 87. For this purpose the shaft 41 is mounted in the frame on ball-sleeve bearings 104, the shaft is connected rotatably to the yoke by collar 105 and axial thrust anti-friction bearings 106, and the screw 83 is threaded to a nut 107 secured to the yoke. Because the screw threads of nuts 87 and 107 are of the same axial lead, rotation of screw 83 to adjust the bracket 34 along shaft 41 does not affect the relative positions of piston 101 and nut 87.

The set-over of the bracket 34 by means of piston 101 changes the rake angle to which the blades of cutter C are sharpened and may be employed in the case of double-angle sharpening, explained in the afore-mentioned co-pending application Serial No. 63,414. In the event no set-over by piston 101 is required, pressure may be applied continuously to the left face of the piston (in FIG.

5), or nut 97 may be adjusted to its limit position to the right, wherein it holds nut 87 against shoulder 96.

Figure 10:
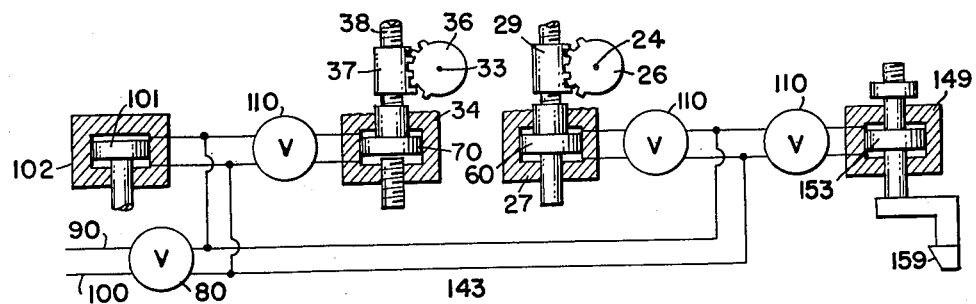
FIG. 10 is a schematic view illustrating the hydraulic circuit arrangement of set-over mechanisms incorporated in the machine.

The set-over by piston 101 may be accompanied by simultaneous set-overs of the cutter C about axis 24 and of work head 27 about axis 33. As shown in FIG. 10, the set-over about axis 24 is effected by a piston 60 that is connected to rack 29 (see FIG. 1) and is reciprocable in a cylinder in the work head, while that about axis 33 is effected by a piston 70 that is connected to screw 38 and is reciprocable in a cylinder in bracket 34. In addition to these three set-overs, which correspond to those disclosed in the co-pending application Serial No. 63,414, there may be, according to the present invention, a simultaneous set-over of the cutter in a vertical direction, effected by means including a piston 153 reciprocable in a cylinder 149, described in detail hereinafter in connection with FIGS. 6, 7 and 8. Simultaneous actuation of pistons 60, 70, 101 and 153 may be effected by manual operation of a shut-off and reversing valve 80 for connecting the respective cylinders to hydraulic pressure and return lines 90 and 100; while selection of the direction of set-over by pistons 60, 70 and 153 relative to the direction of actuation of piston 101 may be made by means of manually operable reversing valves 110.

The mechanism 42 for raising and lowering the bracket 34 and work head 27 comprises a cylinder member 108, FIG. 6, secured to frame 10 and having upper and lower cylinder heads 109 and 111. Slidable in cylinder bore 112 there is a main piston 113 having an upper rod 114 extending through head 109 and a lower rod 115 extending through head 111. An auxiliary piston 116 is slidable on rod 115 and in cylinder bore 117. A slide 118 which carries roller 43 is suitably gibbed to the cylinder member 108 for vertical adjustment thereon, and rotatably supports an adjusting screw 119 which is threaded to a nut 121 secured to rod 114. A bevel gear 122 on the screw meshes with a pinion 123 whose shaft is rotatable in slide 118 and has a wrench socket 124. By rotation of this shaft the screw 119 may be turned to adjust the slide and roller 43 up or down relative to piston 113. The latter has secured thereto a key 125 which engages slide 118 and holds it and nut 121 against rotation during such adjustment. By this adjustment the cutter may be so adjusted vertically that in the uppermost position of piston 113, wherein it abuts or nearly abuts cylinder head 109, the cutter blades will be sharpened to the desired depth by the wheel W.

When a cutter is being mounted or removed the pistons 113 and 116 are in their lowermost positions shown in FIG. 6. By application of hydraulic pressure through passage 126, auxiliary piston 116 is elevated to its upper limit position, and by application of pressure through line 127 (lower than that applied through passage 126) the main piston 113 is also raised to its upper limit position, in abutment with head 109, bringing the cutter to sharpening position. Preceding each operation of the cutter indexing mechanism within housing 25, the pressure in passage 127 is released, allowing the piston 113 to descend to position 113' wherein it abuts now-elevated auxiliary piston 116. This lowers the cutter clear of the path of wheel W. After indexing, pressure through passage 127 is re-applied, again raising the cutter to sharpening position. After all of the blades of the cutter have been sharpened, release of pressure in both passages 126 and 127 causes lowering of the cutter to removal position.

In the case of double-angle sharpening, explained in the afore-mentioned co-pending application Serial No. 63,414, the set-overs along axis 39, and about axes 24 and 33, may raise or lower the bottom of the cutter blade in sharpening position relative to the grinding path of the edge of the grinding wheel, resulting in finish grinding the blade either too deeply and thereby imposing an excessive load on the edge of the grinding wheel or too shallowly and thereby leaving an incompletely finish-sharpened blade face. To compensate for such change in relative height of the cutter blade bottom the machine is preferably arranged to provide an additional set-over in the elevated or sharpening position of the cutter. This is accomplished by a variable stop mechanism by which the upper limit position of piston 113 (and hence of roller 43), FIG. 6, may be at one level for the preliminary grinding of the blades to one rake angle and at a different level for the final grinding at a different rake angle.

The variable stop mechanism, shown in FIGS. 1, 7 and 8, comprises a cylinder 149 which has cylinder heads 150 and 151 and is secured to a guide plate 152 which in turn is secured to the frame 10. A piston 153, movable back and forth in the cylinder bore by fluid pressure, is rigidly connected by piston rod 154 and end plate 155 to a slide 156 disposed in and guided by a groove 157 in the guide plate. One end of the slide is forked to extend on opposite sides of piston rod 115 (which appears also in FIG. 6) and of a block 158 secured to the lower end of the rod 115. The forked end of the slide has inclined lower faces 159 adapted for surface contact with complementary inclined upper faces 160 on the block when the piston rod and the block are elevated. Abutment of faces 160 with faces 159 serves to limit the upward motion of piston 113, FIG. 6, and to thereby determine the upper limit position of bracket 34 and the cutter C carried thereby.

In the condition shown in FIG. 7, wherein the piston 153 is held by pressure in its left limit position, in abutment with cylinder head 150, the piston 113 is against head 109 of cylinder 108, or nearly so. When, by reversal of the fluid pressure application to piston 153, the latter is moved to its right limit position, wherein the inclined faces 159 are advanced, for example to the position shown in broken lines at 159', the upper limit position of bracket 34 and cutter C is lowered accordingly. Thus, the cutter C may be held at one elevation for preliminary sharpening and at a different elevation for finish sharpening by reversal of the application of fluid pressure against the piston 153, this preferably being done simultaneously with reversal of pressure against piston 101, FIG. 5.

The magnitude of the set-over may be varied as desired by adjusting the stroke of piston 153. For this purpose a stop disc 162 is adjustably screw threaded to rod 163 of the piston, and is held in adjusted position by a lock nut 164. The stop disc by abutment of its surface 165 with cylinder head 150 limits the stroke of the piston to the right. A graduated scale 166 mounted on the plate 152 cooperates with the graduated right edge of the disc 162 to facilitate accurate adjustment of the latter. If no vertical set-over of the cutter is required, pressure may be applied continuously to one face of piston 153 throughout preliminary and finish sharpening, or the disc 162 may be adjusted to its extreme position to the right on rod 163 to hold the piston against head 150.

Figure 9:
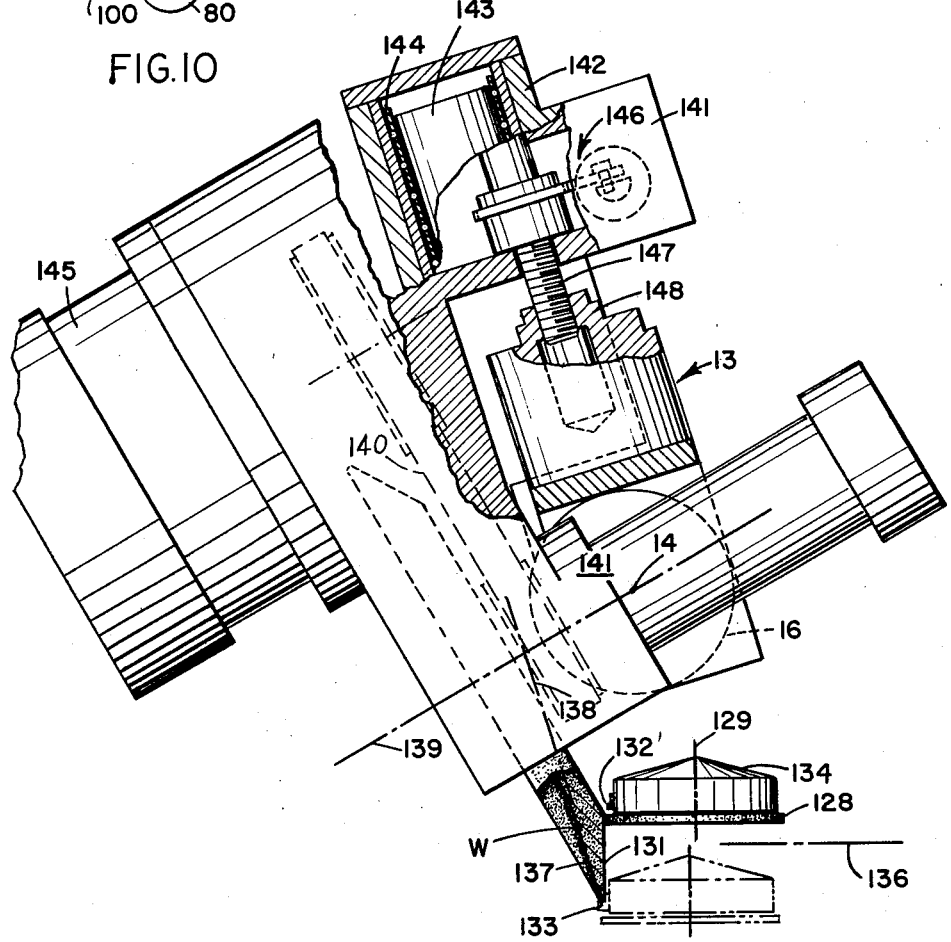
FIG. 9 is a front view of the wheel carriage and related parts, the view being partially in vertical section.

The mechanism for redressing the wheel W may be generally similar to that disclosed in the afore-mentioned co-pending application Serial No. 63,414. It comprises a power driven rotary abrasive disc 128, FIGS. 1, 2 and 9, whose rotation axis is designated 129, for dressing the external conical side face 131 of wheel W, and a non-rotating abrasive element 132 for dressing the tip edge 133 of the wheel. The spindle of the disc 128 and the element 132 are supported by an arm 134 that is pivoted to a dresser motor housing 135 along axis 136, parallel to axis 39, this housing being stationary on the frame. The arm is movable relative to the housing about axis 136 to cause the disc to traverse surface 131, and, in its lowermost position, is movable along axis 136, to the left in FIG. 9, to the position there shown in broken lines, to cause element 132 to dress the tip surface of the wheel. When the arm is swung about axis 136 to its uppermost position, shown in FIGS. 1 and 2, it is clear of the cutter C in sharpening position. Inasmuch as the dresser mechanism is in a fixed position relative to the frame 10, the wheel presents the same profile shape to the cutter after every dressing operation.

Prior to each operation of the dressing mechanism, the wheel W is advanced by a small increment, corresponding to the thickness of wheel stock to be removed in dressing. In order to allow sharpening of cutters having small inter-blade spaces the wheel is made of dish shape, with its inactive side face 137, FIG. 9, an internal cone of larger cone angle than the external conical face 131. Each incremental advance of the wheel W is made in the direction of the generatrix 138 of the conical face 137 that lies in the vertical plane containing the wheel axis 139 and the wheel carriage reciprocation and feed axis 14. Advance in this direction 138 results in maintenance of width of tip edge 133 despite decrease in wheel diameter. The wheel is supported on a spindle journaled in a housing 141 which has rigid therewith two parallel cylindrical portions 142 in which rods 143 constituting parts of carriage 13 are slidable on linear ball bearings 144, these rods and bearings being parallel to generatrix 138. The spindle is connected by an endless belt 140, FIG. 9, to a drive motor 145 mounted on the housing. The incremental advance is obtained by means of a hydraulically operated ratchet mechanism 146 mounted in the housing 141. This mechanism, of a kind known in the art, is adapted on each operation to advance a feed screw 147 rotatively through a small angle. The screw is journaled in the housing and screw threaded to part 148 of the carriage 13.

Having now described the preferred embodiment of my invention and its mode of operation, what I claim is:

1. A cutter sharpening machine comprising a frame, a carriage reciprocable relative to the frame and carrying a grinding wheel having a conical surface for traversing a sharpening plane during such reciprocation, a bracket on the frame supporting a work head for angular adjustment thereon about an axis substantially parallel to the direction of carriage reciprocation, an index housing on the work head journaling a cutter spindle whose axis is in perpendicular intersecting relation to the angular adjustment axis, means for adjusting said index housing on the work head in the direction of the cutter spindle axis, said bracket being mounted on to the frame for movement relative thereto about a pivot axis perpendicular to both the sharpening plane and said axis of angular adjustment, said pivot axis being so widely spaced from the spindle axis in the direction of carriage reciprocation that by movement of the bracket about the pivot axis a cutter on the spindle may be advanced and retracted in the sharpening plane substantially in a direction perpendicular to the wheel stroking motion into and out of the path of the grinding wheel, and means for adjusting said bracket relative to the frame along said pivot axis.

2. A machine according to claim 1 having means for adjusting the index housing on the work head about the cutter spindle axis.

3. A machine according to claim 1 in which there is a piston-cylinder device for moving the bracket about said pivot axis to advance the cutter to the path of the grinding wheel and to retract it from said path.

4. A machine according to claim 3 in which there is a variable stop to limit the advance of the cutter relative to the path of the grinding wheel.

5. A machine according to claim 4 in which there is a piston-cylinder mechanism for moving the variable stop back and forth between two limit positions, and means to adjust the stroke of said mechanism to thereby vary one of said limit positions of the variable stop.

6. A machine according to claim 1 in which there is a variable stop to limit the cutter advancing movement of the bracket, a power-operated device for moving said variable stop back and forth between two cutter-advancing limit positions, and means for limiting the stroke of said device to thereby adjust one of said positions of the stop.

7. A machine according to claim 1 in which the grinding wheel is of dish shape, having an external conical grinding surface of one cone angle and an internal conical surface of larger cone angle, the machine having a dresser for said external conical surface and the tip surface of the wheel, the wheel is carried by a spindle journaled in a housing on the wheel carriage, and means for adjusting said housing on said carriage in the direction of the generatrix of the internal conical surface which is adjacent the sharpening plane and lies in a plane perpendicular to the direction of carriage reciprocation.

8. A machine according to claim 1 in which the wheel carriage is movable angularly about an axis which extends in the direction of carriage reciprocation, for feeding of the grinding wheel to bring its conical grinding surface into tangency with the sharpening plane.

9. A machine according to claim 1 in which there is a mechanism for reciprocating the wheel carriage mounted in a carriage support bracket on the frame, and means for adjusting said carriage support bracket on the frame in the direction of carriage reciprocation.

10. A machine for double-angle sharpening of circular cutters comprising a carriage for a grinding wheel having a conical active surface, the carriage being adapted for reciprocation to cause said surface to traverse a sharpening plane, a spindle for supporting a cutter to be sharpened, and means for effecting relative back and forth shifting between the carriage and the cutter spindle in (a) a direction perpendicular to said sharpening plane, (b) about the spindle axis and (c) about an axis parallel to the path of carriage reciprocation, the machine also having a mechanism operable concomitantly with the afore-mentioned means to effect a relative back and forth shifting between the carriage and the cutter spindle in a direction substantially parallel to the sharpening plane and transversely to said path of carriage reciprocation.

11. A machine according to claim 10 in which said mechanism includes a means to adjust the stroke of the last-mentioned shifting.

References Cited in the file of this patent

UNITED STATES PATENTS

| | | |
|---|---|---|
| 1,802,798 | Webster | Apr. 28, 1931 |
| 1,862,840 | Bullock et al. | June 14, 1932 |
| 1,917,504 | Curtis | July 11, 1933 |
| 2,055,361 | Oliver | Sept. 22, 1936 |
| 2,164,212 | Blond | June 27, 1937 |
| 2,224,959 | Galloway | Dec. 17, 1940 |
| 2,792,673 | Dannert | May 21, 1957 |
| 2,804,722 | Carlsen et al. | Sept. 3, 1957 |
| 2,828,583 | Carlsen et al. | Apr. 1, 1958 |